(12) United States Patent
Pizarro

(10) Patent No.: US 9,580,021 B1
(45) Date of Patent: Feb. 28, 2017

(54) CARGO MANAGEMENT SYSTEM

(71) Applicant: Derrick Anthony Pizarro, San Antonio, TX (US)

(72) Inventor: Derrick Anthony Pizarro, San Antonio, TX (US)

( * ) Notice: Subject to any disclaimer, the term of this patent is extended or adjusted under 35 U.S.C. 154(b) by 0 days.

(21) Appl. No.: 14/701,696

(22) Filed: May 1, 2015

Related U.S. Application Data

(60) Provisional application No. 61/987,447, filed on May 1, 2014.

(51) Int. Cl.
  *B60R 5/04*  (2006.01)
  *B60R 5/00*  (2006.01)
  *B60J 7/16*  (2006.01)

(52) U.S. Cl.
  CPC ............. *B60R 5/045* (2013.01); *B60J 7/1607* (2013.01); *B60R 5/003* (2013.01)

(58) Field of Classification Search
  CPC ......... B60R 5/045; B60R 5/003; B60J 7/1607
  See application file for complete search history.

(56) References Cited

U.S. PATENT DOCUMENTS 6,607,228 B2   8/2003 Carter
D484,697 S  *  1/2004 McCoy ................. D3/304

OTHER PUBLICATIONS

Installation instructions for Olympic 907 Mountaineer Rack, http://www.quadratec.com/products/12038_120X_PG.htm, available online on Aug. 13, 2015, 5 pages.
Installation Instructions—Rampage Sport Rack 86623, lib.store.yahoo.net/lib/allthingsjeep/86623.pdf, available online on Aug. 13, 2015, 3 pages.
Installation Instructions—Bestop Lower Cargo Rack Bracket, http://www.bestop.com/component/products/?view=product&id=50, available online on Aug. 13, 2015, 5 pages.

* cited by examiner

*Primary Examiner* — Glenn Dayoan
*Assistant Examiner* — Melissa A Black
(74) *Attorney, Agent, or Firm* — The Pizarro Firm

(57) ABSTRACT

A cargo management system for the interior of a vehicle having a removable hardtop may comprise two rails, a rack and a tray. The rails may comprise tie-down anchors. The tray may be secured to the rack using hook-and-loop fasteners.

9 Claims, 5 Drawing Sheets

CARGO MANAGEMENT SYSTEM

CROSS-REFERENCE TO RELATED APPLICATION

This application claims priority to U.S. Provisional Patent Application 61/987,447 entitled "CARGO MANAGEMENT SYSTEM" filed May 1, 2014, which is hereby entirely incorporated herein by reference.

COPYRIGHT NOTICE

This application contains material that is subject to copyright protection. Such material may be reproduced exactly as it appears in Patent and Trademark Office patent files or records. The copyright owner otherwise reserves all rights to such material.

FIELD

The disclosed method and apparatus generally relate to cargo management systems for the interior of a vehicle.

BACKGROUND

Vehicle structures for carrying cargo, and particularly aftermarket cargo structures, are typically mounted on the exterior of a vehicle. Such structure may be mounted on the top, sides, back or over the hood of the vehicle. Any cargo affixed to the structure may be susceptible to environmental damage, theft, and the like. Mounting such structures to the exterior of a vehicle may also tend to reduce fuel efficiency, and adversely change the aerodynamic profile of the vehicle. There exists a need for a method and apparatus for a cargo management system suitable for mounting to the interior of a vehicle.

SUMMARY

A cargo management system for the interior of a vehicle having a removable hardtop secured by bolts, the system comprising a first rail configured to removably mount to the interior right side of the vehicle using a hardtop-securing bolt, the first rail comprising one or more first tie-down anchors; a second rail configured to removably mount to the interior left side of the vehicle using a hardtop-securing bolt, the second rail comprising one or more second tie-down anchors; and a substantially planar rack configured to removably mount at a first end to the first rail and at a second end to the second rails, the rack comprising a plurality of hollow tubes arranged in ladder-like configuration.

DETAILED DESCRIPTION

Figure 1A:
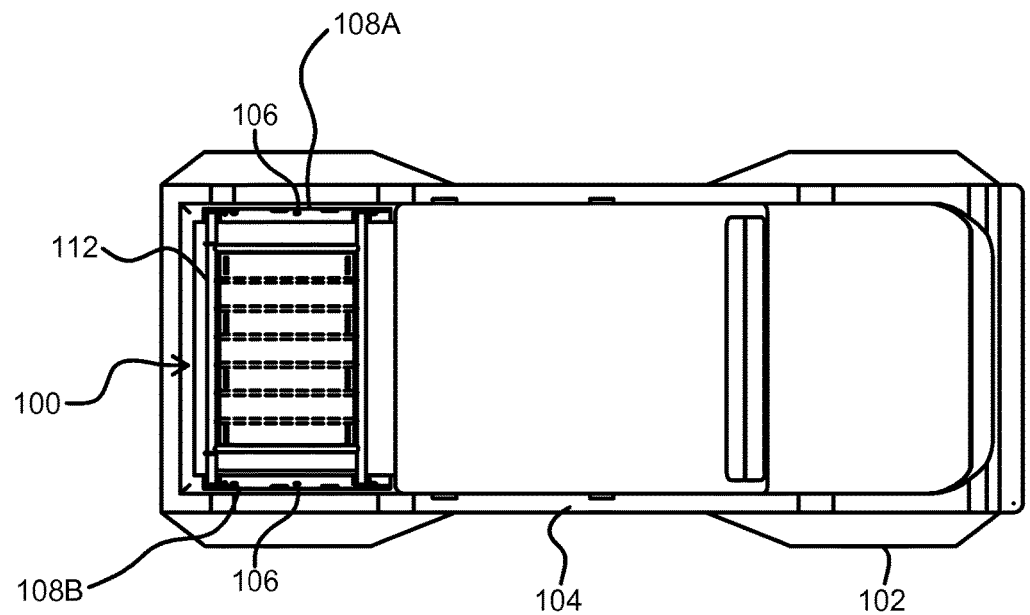
FIGS. 1A and 1B illustrate top and side views, respectively, of one embodiment of a vehicle having a cargo management system mounted in the interior of the vehicle.
Figure 1B:
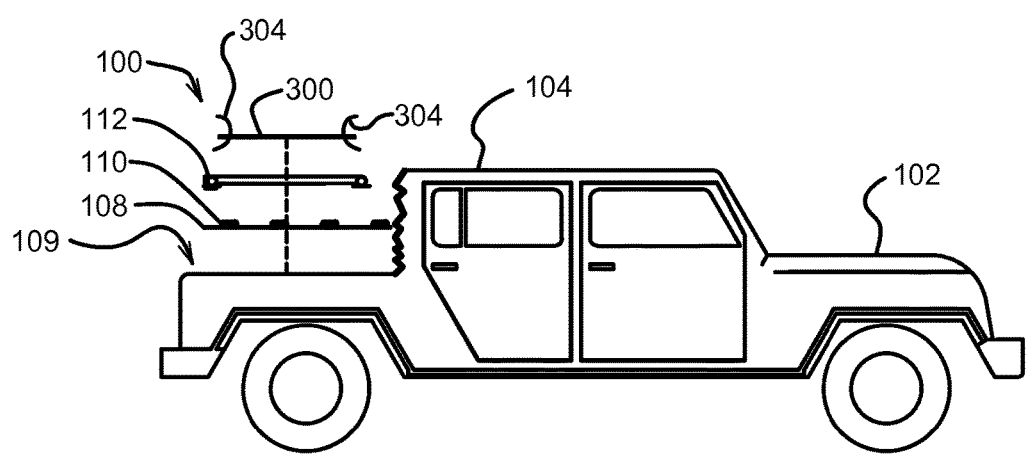

FIGS. 1A and 1B illustrate an embodiment of a cargo management system 100 configured for the interior of a vehicle 102 having a removable hardtop 104, such as a Jeep® Wrangler® sport utility vehicle. FIG. 1A provides a top view thereof, and FIG. 1B provides a side view thereof. FIG. 1B illustrates the cargo management system 100 in an exploded view. A hardtop 104 may be removably attached to the vehicle by bolts 106. In the exemplary vehicle of FIG. 1, a hardtop 104 may be affixed by six bolts 106, with three bolts on each side of the vehicle 102.

A cargo management system may comprise one or more rails 108. In some embodiments, two rails 108 may be removably mounted to the interior of the vehicle 102. A first rail 108A may be mounted to one side of the vehicle using a set of three hardtop mounting bolts 106. A second rail 108B may be mounted to the other side of the vehicle using a second set of three hardtop mounting bolts 106. The rails 108 may comprise a substantially planar material, or at least comprise a surface configured for mounting to the vehicle 102.

Figure 2A:
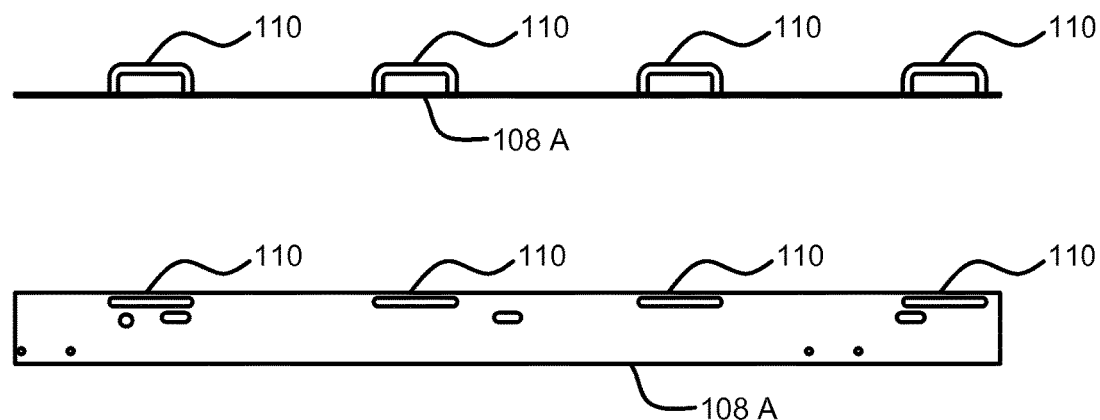
FIGS. 2A and 2B illustrate top and side views, respectively of one embodiment of a pair of tie-down rails.
Figure 2B:
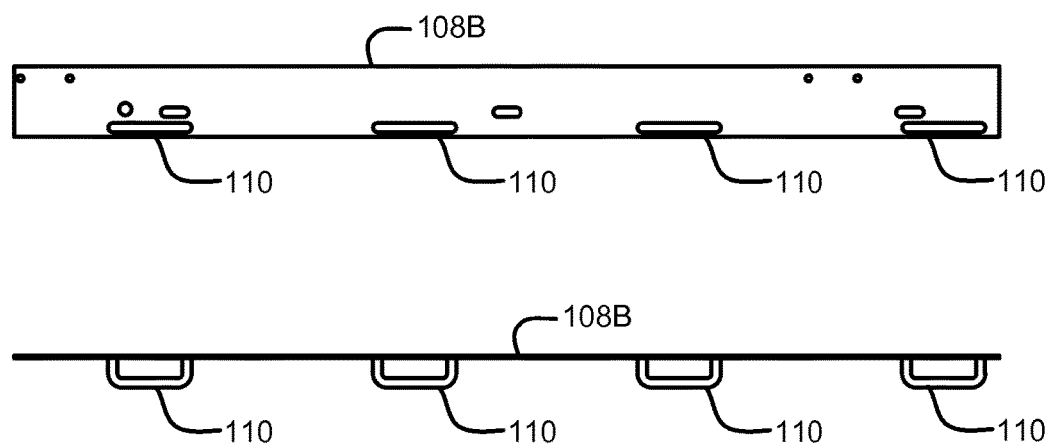

As may be further seen in the embodiment of FIGS. 2A and 2B, each rail 108 may further comprise one or more tie-down anchors 110. FIG. 2A illustrates an exemplary left-side rail in plan and side view. FIG. 2B illustrates an exemplary right-side rail in plan and side view. In some embodiments, each tie-down anchor 110 may be formed from a bar anchored at each end to a rail.

Figure 3:
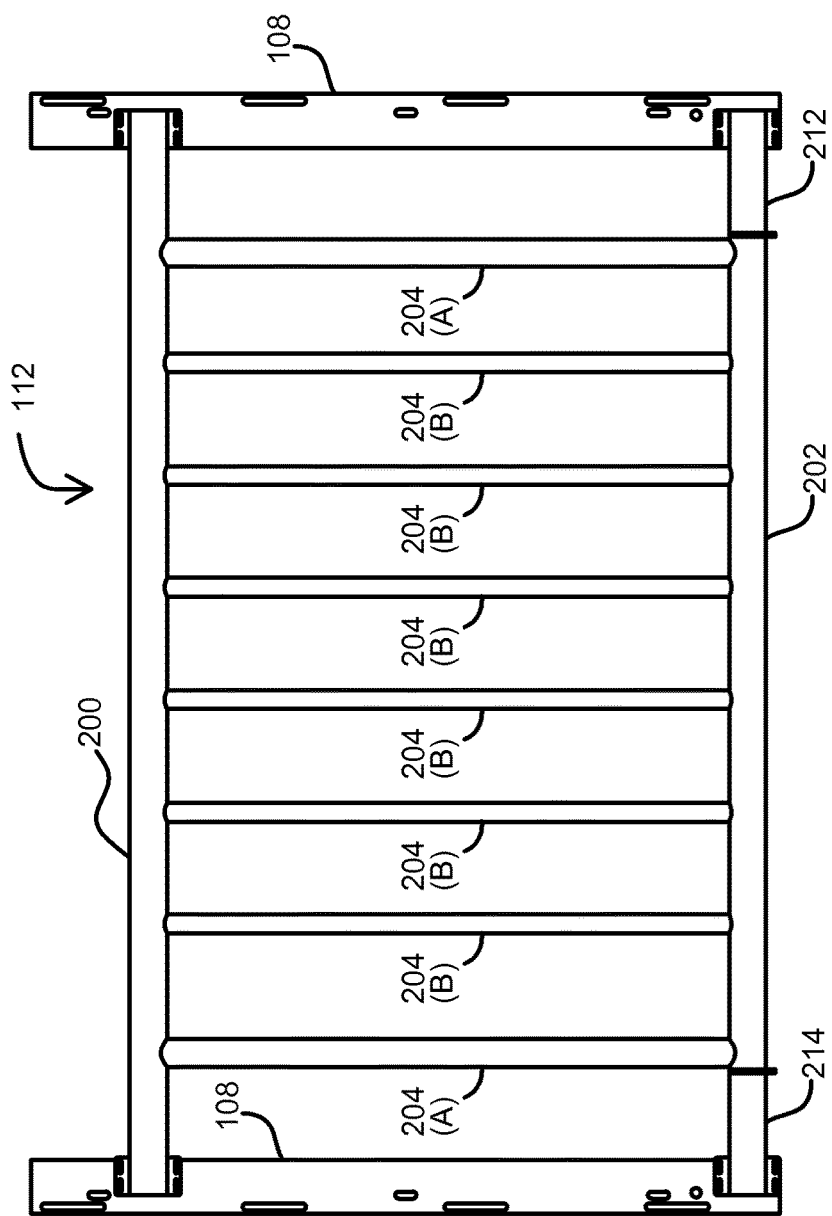
FIG. 3 illustrates one embodiment of a rack removably mounted to tie-down rails.

A cargo management system may comprise a rack 112 removably mountable to the one or more rails 108. The rack 112 may comprise a substantially planar structure. In some embodiments, the rack may comprise tubing arranged in a generally ladder-like configuration. With reference to FIG. 3, for example, a first span tube 200 and a second span tube 202 may be arranged in a generally parallel configuration. A plurality of cross tubes 204 may be arranged between the first and second span tubes 200 and 202. In some embodiments, six cross tubes 204 may be used.

The cross tubes 204 may be generally parallel to each other, and generally perpendicular to the span tubes 200 and 202. The span tubes and cross tubes may comprise a variety of cross-sectional shapes, such as round or polygonal. In some embodiments, the rack 112 may comprise solid bar members. In yet further embodiments, the span and cross tubes may comprise a variety of dimensions. For example, the span tubes 200 and 202 and two outer cross tubes 204(A) may be 1.5 inches in diameter. The inner cross tubes 204(B) may be 1 inch in diameter. The two 1.5-inch cross tubes 204(A) may be placed first and last in the array of cross-tubes, and the cross-tubes 204(B) between each of those 1.5-inch tubes may each be 1 inch in diameter.

Figure 4:
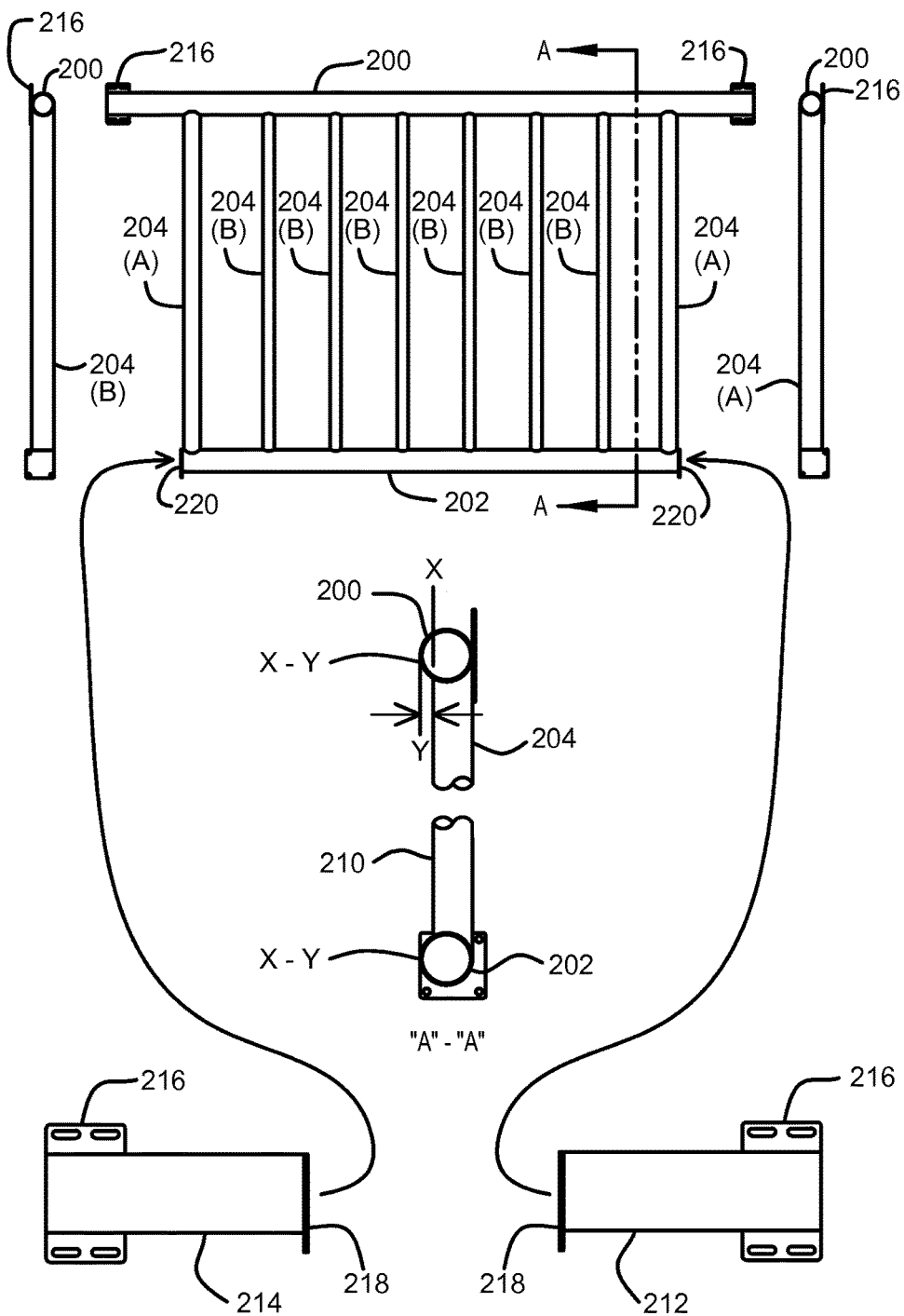
FIG. 4 illustrates one embodiment of a rack, including both left side and right side views of said rack.

In some embodiments, the smaller-diameter cross tubes 204 may be aligned along one side with the sides of the larger-diameter span tubes 200 and 202 and cross tubes, as may be seen in the embodiment of FIG. 4. That is, if a rack is on a flat surface, the larger-diameter cross tubes and the smaller-diameter cross tubes may all rest on the surface, thus leaving the top of the smaller-diameter at a lower level X than the top of the larger diameter cross-tubes Y, as may be seen in cross-section A-A of FIG. 4. So arranged, the span tubes and two outer cross-tubes, each being of larger diameter than the inner cross-tubes, may form a slightly raised border around the plane formed by the interior smaller-diameter cross tubes. For example, if the span tubes and outer cross-tubes are each 1.5 inches in diameter, and the inner cross-tubes are each 1 inch in diameter, the slightly raised border X-Y may be approximately ½ inch high, resulting in an inner "deck" 210 of 1-inch tubes surrounded by 1.5-inch tubes.

For ease of installation and removal from a vehicle, one or both of the span tubes may comprise a plurality of sections. In one embodiment, such as may be seen in FIG. 4 (which illustrates left side and right side views of the embodiment of FIG. 4), one span tube 202 may comprise two detachable shorter segments 212 and 214. The two shorter segments 212 and 214 may form each end of the span tube 202. The span tubes 200 and 202 may each be provided with a substantially planar rail flange 216 at one end. The planar rail flanges may allow for removable attachment of the rack to the rails. The span tube segments 212 and 214 may comprise substantially planar rack flanges 218. The segments 212 and 214 may extend orthogonally from the rack flange 218. Each rack flange 218 may removably attach to a corresponding rack flange 220 affixed to the end of the span tube. Removable attachment may be by bolt and nut, for example.

The rail and rack flanges may be affixed by welding, adhesive, threaded fastener or any other suitable means. A rail flange may be attached to a rail by threaded fastener, by welding or any other suitable means.

Figure 5:
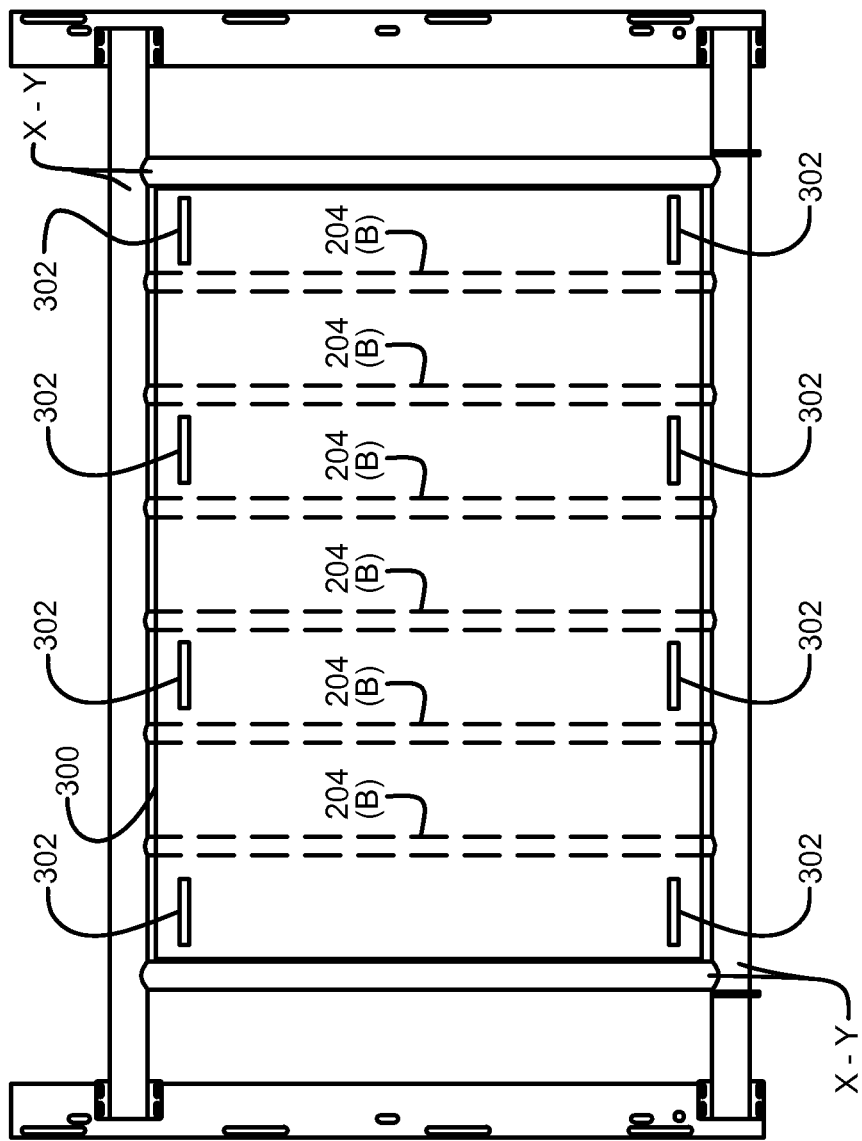
FIG. 5 illustrates one embodiment of a tray disposed on the embodiment of FIG. 3.

In some embodiments, with reference to FIGS. 1B and 5, a tray 300 may be configured to fit on the inner "deck" formed by the inner cross tubes 204. The tray may be dimensioned so as to fit within the slightly-raised border X-Y formed by the 1.5-inch tubes. The tray may be, for example, 0.25-inch thick and substantially planar. The tray may be made of any relatively rigid material, such as wood, glass, metal, cardboard, plastic, polycarbonate and the like. The tray may be secured to the rack by hook-and-loop fastener straps, clamps, threaded fastener, welding, friction fit or any other suitable means. For example, if hook-and-loop fastener straps 304 are used, one or more slots 302 may be provided in the tray for the straps to pass through.

In some embodiments, a cargo management system may be used with a removable hard-top to provide a way to secure cargo in the interior of a vehicle. In other embodiments, a cargo management system may be used with the hardtop removed, and the system mounted to the vehicle using the hardtop mounting hardware or other suitable threaded fastener. If the cargo management system is mounted to the vehicle without the hardtop, the system may provide a way to secure larger cargo items in the space (109, with reference to FIG. 1B) formed by the floor and sides of the vehicle, and the cargo management system.

A cargo management system may comprise just cargo tie-down rails as described herein. A cargo management system may further comprise a rack as described herein and removably mounted to the rails. A cargo management system may yet further comprise a tray as described herein and removably mounted to the rack.

Although the present disclosure and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

I claim:

1. A cargo management system for the interior of a vehicle having a removable hardtop secured by bolts, the system comprising:
   a first rail configured to removably mount to the interior right side of the vehicle hardtop using a first hardtop-securing bolt;
   a second rail configured to removably mount to the interior left side of the vehicle hardtop using a second hardtop-securing bolt; and
   a substantially planar rack configured to removably mount at a first end to the first rail and at a second end to the second rail, the rack comprising a plurality of hollow tubes arranged in ladder-like configuration.

2. The system of claim 1, the plurality of hollow tubes comprising:
   a first span tube and a second span tube, the first and second span tubes being configured to removably mount at each end thereof to the first and second rails, the first span tube comprising detachable segments; and
   a plurality of cross tubes attached substantially orthogonally at each end to a span tube, the cross tubes being spaced apart in a ladder-like configuration.

3. The system of claim 2, wherein the span tubes and the two end cross tubes are of a larger diameter than the inner cross tubes, and wherein the plurality of hollow tubes form a substantially common plane on one side of the rack, and an inner deck on the other side of the rack.

4. The system of claim 3, further comprising a substantially planar tray configured to removably rest on the inner deck.

5. The system of claim 4, wherein the tray comprises a plurality of hook-and-loop fastener straps arranged to allow securing the tray to the rack.

6. The system of claim 1, the first rail comprising one or more first cargo tie-down anchors separate from the first hard-top securing bolt, and the second rail comprising one or more second cargo tie-down anchors separate from the second hard-top securing bolt.

7. A cargo management system for the interior of a vehicle having a removable hardtop secured by bolts, the system comprising:
   a first rail configured to removably mount to the interior right side of the vehicle hardtop using a hardtop-securing bolt, the first rail comprising one or more first cargo tie-down anchors separate from the first hard-top securing bolt; and a second rail configured to removably mount to the interior left side of the vehicle hardtop using a hardtop-securing bolt, the second rail comprising one or more second cargo tie-down anchors separate from the second hard-top securing bolt.

8. A method of managing cargo for the interior of a vehicle having a removable hardtop secured by bolts, the method comprising:
   removably mounting a first rail to the interior right side of the vehicle hardtop using a hardtop-securing bolt, the first rail comprising one or more first cargo tie-down anchors separate from the first hard-top securing bolt; and removably mounting a second rail to the interior left side of the vehicle hardtop using a hardtop-securing bolt, the second rail comprising one or more second cargo tiedown anchors separate from the second hard-top securing bolt.

9. The method of claim 8, further comprising removably mounting a substantially planar rack at a first end to the first rail and at a second end to the second rail.

\* \* \* \* \*